United States Patent [19]

Coffey et al.

[11] 4,355,507

[45] Oct. 26, 1982

[54] SYSTEM FOR INFRARED EMISSION SUPPRESSION (SIRES)

[75] Inventors: Clayton G. Coffey, Medicine Hat; Stephen B. Murray, Montreal; Donald L. Bayly, Calgary, all of Canada

[73] Assignee: Her Majesty the Queen in right of Canada, as represented by the Minister of National Defence, Ottawa, Canada

[21] Appl. No.: 162,931

[22] Filed: Jun. 25, 1980

[30] Foreign Application Priority Data

Aug. 9, 1979 [CA] Canada .................................. 333602

[51] Int. Cl.³ ........................ F02K 3/04; F23L 13/00; B64D 33/04
[52] U.S. Cl. ..................................... 60/39.5; 60/264; 110/157; 181/262; 239/127.3; 239/265.17
[58] Field of Search ....................... 60/39.5, 264, 262; 239/127.3, 265.17; 110/157; 181/220, 259, 262, 263

[56] References Cited

U.S. PATENT DOCUMENTS

| | | | |
|---|---|---|---|
| 2,988,302 | 6/1961 | Smith | 181/220 |
| 3,970,252 | 7/1976 | Smale | 239/127.3 |
| 3,981,448 | 9/1976 | Demogenes | 239/127.3 |
| 4,004,416 | 1/1977 | Amelio | 239/127.3 |
| 4,018,046 | 4/1977 | Hurley | 60/264 |
| 4,044,555 | 8/1977 | McLoughlin | 239/127.3 |
| 4,136,518 | 1/1979 | Hurley | 60/264 |
| 4,215,537 | 8/1980 | Hurley | 60/39.5 |
| 4,295,332 | 10/1981 | Steyer | 239/127.3 |

*Primary Examiner*—Douglas Hart
*Attorney, Agent, or Firm*—Stevens, Davis, Miller & Mosher

[57] ABSTRACT

Film cooling apparatus adapted to be connected into a conduit carrying a hot exhaust gas. The apparatus comprises single walled contoured duct means connectible to said conduit and a center-body aerodynamically shaped and supported within said duct means so as to form therewith an annular channel of zero pressure gradient. Slot means are provided in the single walled contoured duct means and in the center-body to enable a flow of cooling air over exterior surfaces thereof to maintain said surfaces at an acceptably low temperature. A network of ducting carries the cooling air to the contoured duct means and interior of the center-body. The duct means and center-body are preferably of circular cross-section taken orthogonally of the overall flow direction. The center-body is an axisymmetric bulb having annular slots for directing the cooling air over the exterior of said bulb. The center-body connects with a plenum chamber formed by said single walled duct means and an exterior section of the network of ducting. The plenum chamber is also connected to a source of cooling air. An entraining diffuser is connected to said contoured duct means downstream of the center-body. Slots in the center-body, duct means and entraining diffuser are preferably from about 0.25" to about 0.750" in width.

14 Claims, 2 Drawing Figures

SYSTEM FOR INFRARED EMISSION SUPPRESSION (SIRES)

This invention relates to film cooling apparatus. More particularly, the invention relates to cooling of surfaces of conduits carrying a hot gaseous medium, preferably hot exhaust gases, by means of film cooling of those surfaces.

BACKGROUND OF THE INVENTION AND PRIOR ART

It is known that power plants or driving engines in the form of internal combustion engines, gas turbines, furnaces or the like produce exhaust gases which are very hot. Despite significant heat losses from associated ducting, such exhaust gases often are at temperatures in the order of 800°-900° F. when they are to be discharged. In many instances such temperatures are unacceptably high. This may be for reasons of safety, or strategic grounds.

One arrangement of film cooling of exhaust ducts is shown in Canadian Pat. No. 995,015, issued on Aug. 17, 1976 to the General Electric Company. FIG. 1 of this patent shows a passageway having openings therein through which a film of cooling air passes. This cooling air is said to protect the liner and surrounding casing from the high gas temperatures associated with operation of an augmenter. The exhaust gases are from an aircraft's gas turbine engine.

Another arrangement more relevant for present purposes is disclosed in Canadian Pat. No. 999,444 which issued on Nov. 9, 1976 to General Motors Corporation. This patent teaches a structure by which film cooling of exhaust duct surfaces is achieved, while also reducing light or infrared radiation from the exhaust pipe of an aircraft gas turbine. FIG. 2 shows an annular plenum chamber having metered openings in one wall thereof to feed cooling air to an intermediate zone or chamber. Such intermediate chamber is defined by the apertured wall of the plenum chamber and an outer, slotted wall forming one side of the exhaust passage. The other side of the exhaust passage is defined by a bulbous hollow inner body. Thus, the outer wall of the exhaust passage or duct is of "a doublewalled construction", as described on page 3 at lines 6-7 of Canadian Pat. No. 999,444. The slotted wall of the intermediate chamber enables the flow of ram air cooling air over the outer surface of the exhaust duct or passage.

Six radial struts support the inner body or core. These struts are hollow and conduct ram air cooling air from the plenum chamber to the interior of the bulbuous inner body. From there the air passes through gaps to provide for film cooling of the inner body. The inner body is thus cooled, and also serves to block direct sight via the exhaust passage into the turbine. Any infrared radiation from that turbine must be reflected from the walls to escape to the exterior.

SUMMARY OF THE INVENTION

The present invention acknowledges the benefits derived from the 999,444 patent. However, further valuable improvements are incorporated into the embodiments of this invention. Certain simplifications have also been made herein. The present invention, for instance, eliminates the double skinned outer wall structure of the exhaust passage of the 999,444 patent. Savings in weight and material are thus gained, of particular importance in mobile applications. Moreover, this invention includes a downstream entraining diffuser for added cooling and diffusing of the exhaust plume. Also, the tubular struts described herein are shaped as airfoils and are preferably used to straighten the flow of exhaust gases, thereby reducing losses of kinetic energy. These latter features are totally missing from the 999,444 patent.

Accordingly, there is provided by one aspect of this invention film cooling apparatus adapted to be connected into a conduit carrying a hot gaseous medium, the apparatus comprising contoured duct means of a single wall thickness connectible to said conduit and having slot means therein; a centre-body aerodynamically shaped and supported within the contoured duct means so as to form therewith an annular channel of zero pressure gradient, the centre-body having slot means therein to enable cooling flow of a coolant fluid over exterior surfaces of the centre-body for maintaining an acceptably low surface temperature thereof; a network of ducting to interconnect the contoured duct means and interior of the centre-body to a source of the cooling fluid, and an entraining diffuser section connectible to downstream portions of the contoured duct means and operative to promote the entrainment of further quantities of a coolant fluid and to decelerate the exhaust flow in order to realize a pressure recovery.

By another aspect of this invention there is provided film cooling apparatus adapted to be positioned in a conduit adapted to carry hot exhaust gases, the apparatus comprising; a network of ducting adapted to be connected into the conduit, and including a plenum chamber therein connectible to a source of cooling gases; contoured and slotted duct means within the network of ducting and defining therewith the plenum chamber, the slotted duct means including an upstream segment of increasing cross-section, a centre segment of maximum cross-section, and a downstream segment of decreasing cross-section, there being slot means provided between the segments; a centre-body aerodynamically shaped and supported within the contoured duct means, the centre-body being shaped and so positioned as to form with the segments of the contoured duct means an annular channel of zero pressure gradient generally peripherally of the centre-body, a slotted and radially inner wall of the plenum chamber and the centre-body defining side walls of the annular channel, the centre-body including therein annular slot means enabling cooling flow of the cooling gases over exterior surfaces of the centre-body to maintain an acceptably low surface temperature thereof; support means in the form of tubular struts for supporting the centre-body within the contoured duct means, the tubular struts bridging upstream portions of the annular channel to place the plenum chamber in flow communication with the interior of the centre-body; and an entraining diffuser is connected to downstream portions of the contoured duct means, the diffuser being configured to entrain cooling ambient air to further cool a plume mixture of gases downstream of the centre-body and to declerate the flow, thus recapturing a significant degree of exhaust gas kinetic energy in the form of a pressure recovery.

The above and other features of this invention are best understood from the following detailed description. This description is to be read in conjunction with the accompanying drawings which illustrate certain embodiments of this invention.

DESCRIPTION OF THE PREFERRED EMBODIMENTS

Figure 1:
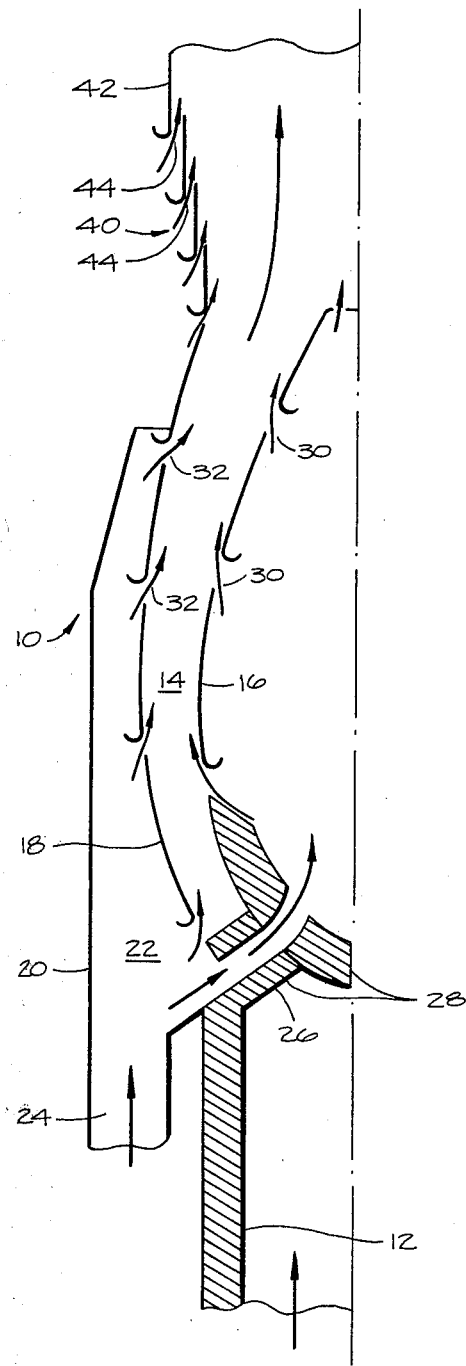
FIG. 1 shows schematically a longitudinal cross-sectional view of an exhaust duct incorporating this invention.

FIG. 1 shows the present film cooling apparatus at 10. This cooling apparatus 10 is connected to an exhaust conduit 12 used for carrying hot exhaust gases from a driving engine, a furnace, or the like. Typically, these hot exhaust gases have a temperature in the order of 900° F.

The exhaust gases enter the cooling apparatus 10 and are conducted along an annular passage 14. This passage 14 is defined by an inner wall which is formed by a hollow bulbous inner body 16. An outer wall of the passage 14 is in the form of a slotted contoured duct 18 of a single thickness wall construction. Beyond the contoured duct 18 there is provided an exterior section 20 of a network of ducting. The space or region between contoured duct 18 and section 20 of the network of ducting defines a plenum chamber 22. The plenum chamber 22 connects by ducting 24 to a source of cooling fluid, typically ambient or other air.

The inner body 16 is aerodynamically shaped and axisymmetric in form. It is supported from the contoured duct 18 by a plurality of tubular struts 26. These struts 26 connect the plenum chamber 22 with the interior of the inner body 16. Some insulating material shown at 28 is provided exteriorly of the exhaust conduit 12, and interiorly of the struts 26 and upstream portions of the inner body 16. This insulation reduces thermal stresses at connections of the various parts to one another and minimizes the transfer of heat from the exhaust gases in conduit 12 to the cooling air in struts 26 and inner body 16.

The inner body 16 is aerodynamically shaped, and coacts with the contoured duct 18 to generate and maintain a zero pressure gradient in the flow of exhaust gases in passage 14. To further assist the flow in that passage 14, each strut 26 is shaped in cross-section as an airfoil, and preferably is positioned so as to act as a flow straightener. Kinetic energy losses in the flow of exhaust gases can thus be minimized, with back pressures on the source of exhaust gases being reduced substantially.

Each of the walls of annular passage 14 is provided with slots 30 and 32. The slots 30, 32 enable a film flow of cooling air to be directed over the surfaces of inner body 16 and contoured duct 18.

The contoured duct 18 is formed of a series of ring segments whose upstream edges are curled back to promote laminar flow through slots 32. The injection of cooling fluid (air) tangentially through slots 32 provides a local cooling efficiency of 0.96 when forced air is used. Cooling efficiency is here defined as $$\eta = (T_g - T_w)/(T_g - T_a)$$

where
$T_g$ = Gas Temperature
$T_w$ = Wall Temperature
$T_a$ = Cooling Air Temperature The ring segments are interconnected one to another in a manner forming the slots 32. These are preferably one quarter inch (0.250") in width, and each slot cools a six (6) inch length of duct 18. However, many combinations of slot width and length for a given efficiency are possible.

The plenum chamber 22 constitutes a reservoir of cool air which is in contact with the single thickness wall of the contoured duct 18. Together with the flow of such cooling air via slots 32, as a film, this arrangement effectively maintains the surface temperatures at acceptable levels.

As another feature of this invention, cooling apparatus 10 includes an entraining diffuser shown overall at 40. The diffuser 40 is connected to a section of the contoured duct 18 at a location generally adjacent the downstream extremity of the inner body 16. The diffuser 40 comprises a plurality of annular ring sections or segments 42. Successive segments are of increasing radius, to provide a total expansion in diameter. The degree of expansion is dependent upon the extent of plume cooling and energy recovery that is desired. There are slots 44 which separate adjacent segments 42 from each other. The flow of cooled exhaust gases entrains ambient air into that flow, to cool even further the plume of exhaust gases. The temperature of the plume is typically about 500° F.

The width of slots 44 were tested in the range of from 0.25" to 0.75" for a duct diameter of two (2) feet. It was found generally that cooling efficiency improved with higher volume flow rates of cooling fluid, i.e., air. However, it will be appreciated that when natural entrainment is used, the maximum volume flow rate will soon be reached, and will be appreciably lower than the volume flow rate possible with fan-forced air flow. Natural entrainment has the advantages of being simple and passive. Noise is suppressed due to the deceleration of the exhaust gas flow, and the power required to "drive" the system is nil. It is recognized, however, that specific power requirements for a forced air system are very sensitive to the quality of the design's aerodynamics. Cooling efficiencies of 0.96 were reached with forced air cooling, while 0.92 efficiency was achieved with natural air entrainment.

To digress momentarily, it is useful here to discuss entrained air film cooling and forced air film cooling separately, beginning with the former.

For a given exhaust gas velocity the velocity of the entrained stream depends on two ratios; (i) the ratio of exhaust gas temperature to entrained air temperature, and (ii) the ratio of exhaust duct cross-sectional area to total duct cross-sectional area (exhaust duct plus cooling air passage). As either of these ratios increases the velocity of the entrained stream decreases. It is apparent, then, that in describing entrainment through a slot of a specific width it is important that the duct size be specified. In our case a 2-foot duct was employed to give the area ratio that we required in order to realize the amount of entrainment that was necessary to achieve the desired amount of wall cooling. This naturally depends on the specific application. In our case, a cooling efficiency of approximately 90% was the target.

Next consider forced air film cooling. Unlike the entrained air situation the velocity of the coolant can be varied independent of the exhaust gas flow rate. It is a function of geometry and fan performance alone. In our case slots of 0.25 inch width every 6 inches apart provided the 96% cooling efficiency that we desired for our 2-foot diameter duct. However, many combinations of slot width and spacing could be selected to give this or any other cooling efficiency. Thus, the size and spacing of slot openings is such as to provide the degree of film cooling protection necessary for a particular application.

Figure 2:
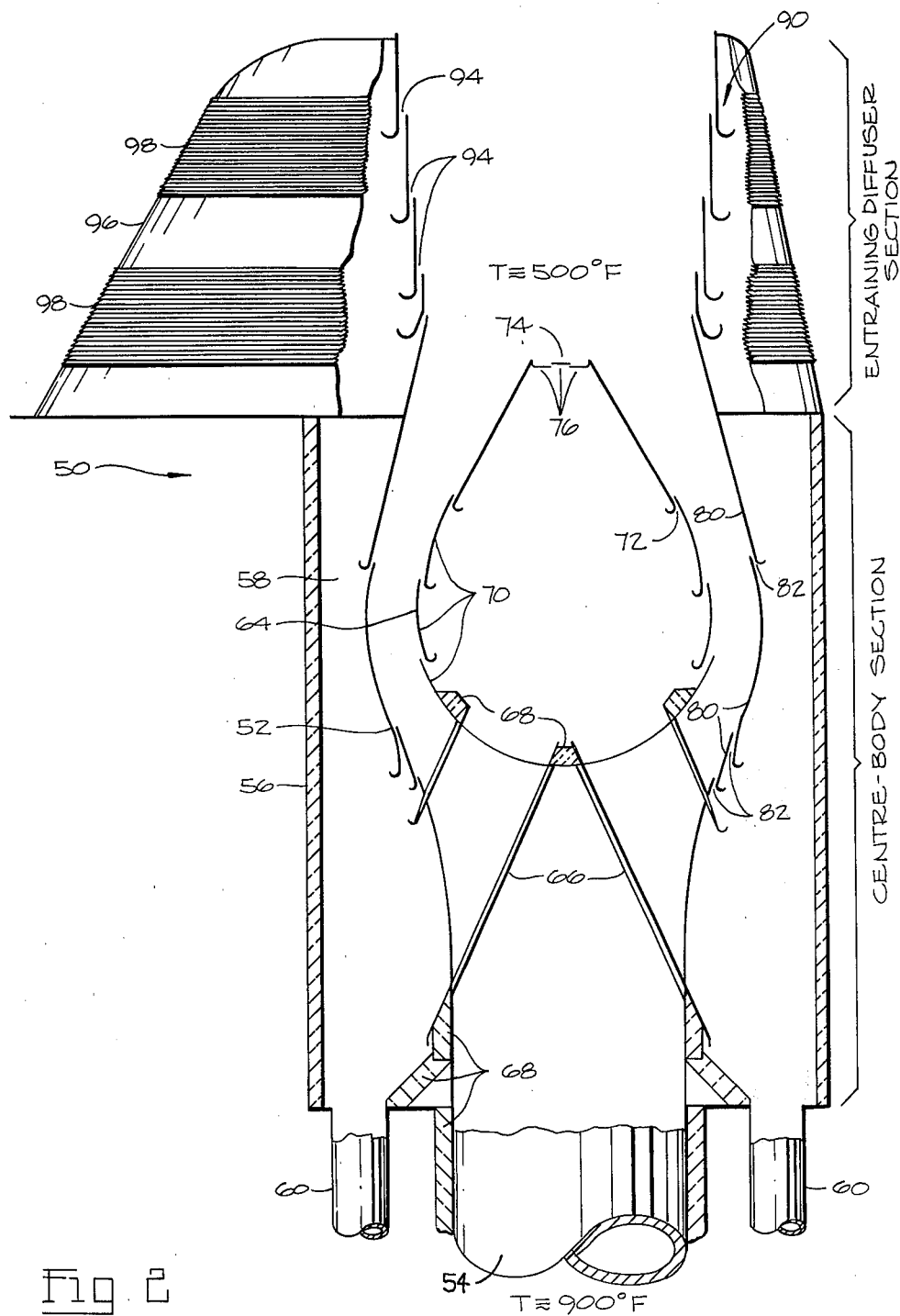
FIG. 2 shows schematically a preferred embodiment of the invention in the context of an exhaust funnel.

Turning now to FIG. 2, a preferred form of film cooling apparatus is shown overall at 50. The cooling apparatus 50 is seen to include a slotted, contoured duct 52 connected to an exhaust conduit 54. Outwardly of the contoured duct 52 is a thermally insulated outer section of ducting 56. The duct 52 and ducting 56 define inner and outer walls of a plenum chamber 58. This chamber connects to a source of cooling air by a duct 60. The source of cooling air is often the "engine" room, i.e., that room which houses the driving engine or furnace generating the hot exhaust gases mentioned earlier. In this manner fresh, ventilating air pumped into the engine room can displace engine room air which now will be used for cooling purposes.

The hot exhaust gases are carried along an annular passage 62. The inner wall of the passage 62 is defined by the surface or wall of an inner body 64. Inner body 64 is tear-drop shaped, i.e., an axisymmetric globular shape. The interior of inner body 64 communicates with plenum chamber 58 by a plurality of tubular struts 66. Preferably there are four equally spaced apart struts 66, serving also to support the inner body 64 from contoured duct 52. Each strut 66 is of an airfoil shape in cross-section, and is preferably positioned so as to cause straightening of the flow of exhaust gases entering the annular passage 62. This arrangement coacts with the aerodynamically shaped inner body 64 to minimize kinetic energy losses and the undesirable application of back pressure on the driving engine. Note also, that struts 66 are intentionally concealed in the present invention from any exterior line of sight, thus eliminating the need for strut cooling.

As in the embodiment of FIG. 1, some thermal insulation is provided, as shown at 68, to the exhaust conduit 54, the struts 66 and upstream portions of the inner body 64. Use of the insulation 68 reduces thermal stress at joints or welded connections and minimizes the transfer of heat from the hot exhaust gases in conduit 54 to the cooling air in struts 66 and inner body 64.

The inner body 64 is made of a plurality of annular segments or rings 70, preferably spin-formed of steel or other material known in this art. These segments 70 are interconnected to one another in a manner providing annular slots 72. The downstream extremity of inner body 64 is formed as a turbulence generator 74 whose purpose is to provide adequate mixing of hot exhaust gas and cooling air. In other words, turbulence generator 74 promotes mixing of hot exhaust gases and cooling air from within inner body 64 as well as promoting a uniform temperature distribution of the gases at the exit from apparatus 50. In this instance, turbulence generator 74 comprises a staggered ring and plate combination 76, set back slightly in an upstream direction of the free edge of the annular segment 70 furthest downstream.

The contoured duct 52 is made of spin-formed annular segments, shown at 80. These segments 80 are also of steel or other material commonly used in this art. Segments 80 are interconnected one to another in a manner forming a series of annular slots 82. The upstream edges of each segment 80 or 70 (of inner body 64) are curved in a manner promoting laminar flow of the cooling air through slots 72 and 82. Further, there is a zero pressure gradient along, i.e., streamwise of the passage 62 in order to promote stability of the cool wall jet boundary layers. A zero pressure gradient streamwise was found to be useful for the following reasons. (i) An adverse pressure gradient (i.e., relaxing flow) would promote boundary layer instability and lead to the onset of early flow separation, and hence destruction of the cool films. A favourable pressure gradient (i.e., accelerating flow) would increase the turbine back-pressure. For these reasons a zero pressure gradient was thought to be a reasonable compromise. (ii) The most reliable heat transfer correlations for film cooling are valid only for zero pressure gradient flows. With this arrangement a very efficient film cooling of the surfaces 52 and 64 is achieved. As noted above, cooling efficiencies in the range of 0.90–0.96 are possible with the present design.

Downstream of the inner body 64, the present cooling apparatus 50 includes an entraining diffuser 90. The diffuser 90 is connected to the contoured duct segment 80 furtherest downstream. The diffuser 90 is made of ring sections 92, each of slightly increased radius. Total expansion of the diffuser 90 is typically 10% in diameter taken in the downstream direction for mobile application. Expansion of about 10% in the case of a ship, for instance is due to constraints on available space. In theory, the larger the expansion, the better. A series of slots 94 are formed between the ring sections 92 opening in a space within a louvred funnel outer casing 96. Low loss louvres of funnel outer casing 96 are shown schematically at 98. With louvres 98 and slots 94, the diffuser 90 is able to entrain additional quantities of cooling air into the plume of exhaust gases exiting the funnel 96. Thus the plume is cooled to temperatures less than about 500° F. and decelerated to incur a recovery of exhaust gas kinetic energy, for example, in the form of an increased pressure ratio across the turbine.

The presence of the entraining diffuser tends to reduce the static pressure in the annular passage 62 to below atmospheric pressure. In doing so, it virtually guarantees a significant degree of naturally entrained cooling air through slots 70 and 82.

A general, and a more specific form of the present invention have been described. Some variations have also been indicated. It is intended by this invention to encompass all such changes and modifications as would be apparent to those skilled in this art, and which fall within the claims below.

The embodiments of the invention in which an exclusive property or privilege is claimed are defined as follows:

1. Film cooling apparatus adapted to be connected into a conduit carrying a hot gaseous medium, said apparatus comprising:

contoured duct means for channeling the gaseous medium having an external surface, an internal surface, and a single thickness of material therebetween, said contoured duct means adapted to be connected to said conduit and having slot means for the passage of coolant fluid therein;

a central body aerodynamically shaped and supported within said contoured duct means so as to form therewith an annular channel having a zero pressure gradient, said central body having slot means therein to enable cooling flow of a coolant fluid over exterior surfaces of the central body for maintaining an acceptably low surface temperature thereof;

a network of ducting to interconnect the contoured duct means and interior of the central body to a source of said coolant fluid, said network of ducting and said contoured duct means defining a plenum chamber therebetween which is adapted to be in flow communication with said source of coolant fluid; and an entraining diffuser section connectible to downstream portions of the contoured duct means and operative to promote the entrainment of further quantities of a coolant fluid and to promote the deceleration of exhaust gases for the purposes of energy recovery.

2. The film cooling apparatus defined in claim 1, wherein the contoured duct means includes an upstream segment of increasing cross-section, a central segment of maximum cross-section, and a downstream segment of decreasing cross-section, as taken longitudinally; and wherein the centre-body comprises an axisymmetric bulb mounted concentrically of the contoured duct means.

3. The film cooling apparatus defined in claim 1 wherein said ducting, contoured duct means and central body are of circular cross-section taken orthogonally of the overall direction of flow.

4. The film cooling apparatus defined in claim 2, wherein ducting interconnecting the plenum chamber and interior of the axisymmetric bulb comprises a plurality of tubular struts each having a cross-section in the shape of an airfoil, said struts bridging the flow channel and being operative both for carrying some of said coolant fluid and for supporting said axisymmetric bulb on said contoured duct means.

5. The film cooling apparatus defined in claim 4, wherein said tubular struts are positioned as to function as flow straighteners of said coolant fluid in said flow channel.

6. The film cooling apparatus defined in claim 1, 3 or 4, wherein the hot gaseous medium comprises exhaust gases and the coolant fluid is air.

7. The film cooling apparatus defined in claim 1, 3 or 4, wherein the coolant fluid is cooling air, forced by fan means into the interior of said central body.

8. Film cooling apparatus adapted to be positioned in a conduit adapted to carry hot exhaust gases, said apparatus comprising;

support means in the form of tubular struts for supporting the central body within said contoured duct means, the tubular struts bridging upstream portions of the annular channel to place the plenum chamber in flow communication with the interior of said central body; and an entraining diffuser connected to downstream portions of said contoured duct means, said diffuser being configured to enable entrainment of cooling ambient air to further cool a plume mixture of gases downstream of said central body, to decelerate the flow of gases for purposes of energy recovery and acoustic suppression, and to lower the static pressure in the annular channel thereby ensuring film cooling of the walls of the annular channel by means of natural entrainment in the event of mechanical failure of a drive fan.

9. The film cooling apparatus defined in claim 8, wherein said conduit is an exhaust funnel and the hot exhaust gases are from a driving engine or a furnace.

10. The film cooling apparatus defined in claim 8, wherein said central body comprises a plurality of shaped, annular segments, said segments being spaced one from another to form said annular slot means through which the coolant fluid is conducted with generally laminar flow.

11. The film cooling apparatus defined in claim 1 or 8, wherein said slot means are in the range from about 0.250 inches to about 0.750 inches in width, and said conduit is of about 2.0 feet in diameter internally.

12. The film cooling apparatus defined in claim 1, 4 or 11, wherein the entraining diffuser is connected to downstream portions of the contoured duct means, said diffuser being formed of annular rings of varying diameters supported in a manner providing slots between adjacent rings and an increase in cross-sectional area in a downstream direction, the diffuser causing increased mixing in a plume of additional cooling air a network of ducting adapted to be connected into said conduit, and connectible to a source of coolant fluid;

contoured duct means located within said network of ducting and defining therewith a plenum chamber, said contoured duct means including an upstream segment of increasing cross-section, a central segment of maximum cross-section, and a downstream segment of decreasing cross-section, said contoured duct means further comprising slot means provided between said segments for passage of coolant fluid, said contoured duct means having an external surface and an internal surface and a single thickness of material therebetween;

a central body aerodynamically shaped and supported within said contoured duct means, said central body being shaped and so positioned as to form with said segments of the contoured duct means an annular channel of zero pressure gradient generally peripherally of the central body, said central body including therein annular slot means enabling cooling flow of said coolant fluid over exterior surfaces of said central body to maintain an acceptably low surface temperature thereof and shaped so as to prevent any direct line of sight to uncooled surfaces of the conduit or support means; downstream of the central body with energy recovery and acoustic signature reduction as well as a lowering of static pressure in the annular channel to ensure cooling by entrainment if there is an inadequate supply of coolant fluid to said plenum chamber.

13. A film cooling apparatus adapted to be connected downstream of an exhaust conduit carrying hot exhaust gases from an aircraft gas turbine engine to prevent direct sighting of the exhaust conduit by infra-red detecting devices, said film cooling apparatus being formed about the longitudinal central axis extending from the exhaust conduit and comprising:

means for supplying cooling fluid;

a contoured body connected to an exhaust conduit symmetrically located about said longitudinal central axis having internal and external surfaces and a single thickness of material therebetween, said contoured body having an upstream end proximal to the exhaust conduit of increasing cross section relative to said longitudinal central axis, a center of maximum cross section and a downstream end distal to the exhaust conduit of decreasing cross section, said contoured body having first annular passages for the flow of cooling fluid therebetween, said passages comprising upstream edges which curve radially outwardly to promote generally laminar flow of cooling fluid through said first annular passages such that a first film flow is formed on said internal surface of said contoured body;

a plurality of hollow struts extending radially inwardly from said upstream end of said contoured body;

a tear-drop shaped hollow, inner body supported by said tubular struts radially inwardly and concentrically within said contoured body, said inner body having an interior, an exterior surface, an upstream end proximal to the exhaust conduit and a downstream end distal to the exhaust conduit and having a plurality of second annular passages therebetween, said hollow struts operating to deliver cooling fluid from said cooling means to the interior of said inner body and through said second annular passages so as to form a second film flow adjacent the interior surface of said inner body, said inner body having a turbulence generator located slightly upstream of the downstream end of said inner body comprising a ring and plate combination, said ring being positioned slightly upstream of said plate; said turbulence generator operating to promote mixing of cooling fluid from within said inner body with the exhaust gases;

said contoured body and said inner body being so positioned that the exhaust gases escaping from the exhaust conduit pass through a passage defined by said internal surface of said contoured body and said exterior surface of said inner body, said inner body and said contoured body being aerodynamically configured and positioned to generate a zero pressure gradient in the flow of exhaust gases in said passage thereby promoting stability of said first and second film flows and facilitating efficient film cooling of the external surface of said inner body and the internal surface of said contoured body;

a network of thermally insulated ducting located radially outwardly of said contoured body which carries cooling fluid from said cooling means to said contoured duct, said ducting and said contoured body operating to form a plenum chamber therebetween, said cooling fluid within said plenum chamber operating to cool of said external surface of said contoured body;

an entraining diffuser connected to said contoured body at its downstream end extending along said longitudinal central axis and having a series of third annular passages, said diffuser operating to entrain quantities of cooling fluid into the exhaust gases;

whereby the maintenance of a zero pressure gradient within said passage promotes the stability of said first and second film flows which form over the respective internal and external surfaces of said contoured body and said inner body to maintain the temperatures of the respective surfaces to a low radiation level by substantially precluding transmission of heat from the exhaust gases to said contour body and said inner body.

14. A film cooling apparatus adapted to be connected downstream of an exhaust conduit carrying hot exhaust gases from an aircraft gas turbine engine to prevent direct sighting of the exhaust conduit by infra-red detecting devices, said film cooling apparatus being formed about the longitudinal central axis extending from the exhaust conduit and comprising:

means for supplying cooling fluid;

a contoured body connected to an exhaust conduit symmetrically located about said longitudinal central axis having internal and external surfaces and a single thickness of material therebetween, said contoured body having an upstream end proximal to the exhaust conduit of increasing cross section relative to said longitudinal central axis, a center of maximum cross section and a downstream end distal to the exhaust conduit of decreasing cross section, said contoured body having first annular passages for the flow of cooling fluid therebetwen, said passages comprising upstream edges which curve radially outwardly to promote generally laminar flow of cooling fluid through said first annular passages such that a first film flow is formed on said internal surface of said contoured body;

a plurality of hollow struts extending radially inwardly from said upstream end of said contoured body;

a tear-drop shaped, hollow, inner body supported by said tubular struts radially inwardly and concentrically within said contoured body, said inner body having an interior an exterior surface, an upstream end proximal to the exhaust conduit and downstream end distal to the exhaust conduit and having a plurality of second annular passages therebetween, said hollow struts operating to deliver cooling fluid from said cooling means to the interior of said inner body and through said second annular passages so as to form a second film flow adjacent the interior surface of said inner body;

said contoured body and said inner body being so positioned that the exhaust gases escaping from the exhaust conduit pass through a passage defined by said internal surface of said contoured body and said exterior surface of said inner body, said inner body and said contoured body being aerodynamically configured and positioned to generate a zero pressure gradient in the flow of exhaust gases in said passage to thereby promote stability of said first and second film flows and facilitating efficient film cooling of the external surface of said inner body and the internal surface of said contoured body;

a network of thermally insulated ducting located radially outwardly of said contoured body which carries cooling fluid from said cooling means to said contoured duct, said ducting and said contoured body operating to form a plenum chamber therebetween, said cooling fluid within said plenum chamber operating to cool of said external surface of said contoured body;

whereby the maintenance of a zero pressure gradient within said passage promotes the stability of said first and second film flows which form over the respective internal and external surfaces of said contoured body and said inner body to maintain the temperatures of the respective surfaces to a low radiation level by substantially precluding transmission of heat from the exhaust gases to said contoured body and said inner body.

* * * * *